United States Patent [19]
Inamura et al.

[11] Patent Number: 5,711,537
[45] Date of Patent: Jan. 27, 1998

[54] METAL GASKET WITH A BEAD SURROUNDING BOLT AND OIL HOLES

[75] Inventors: Susumu Inamura, Utsunomiya; Yoshio Miyaoh, Tokyo, both of Japan

[73] Assignee: Ishikawa Gasket Co., Ltd., Tokyo, Japan

[21] Appl. No.: 764,225

[22] Filed: Dec. 13, 1996

[51] Int. Cl.⁶ .................................................. F16J 15/08
[52] U.S. Cl. ........................... 277/235 B; 277/207 R
[58] Field of Search .............................. 277/207 R, 213, 277/235 B, 236

[56] References Cited

U.S. PATENT DOCUMENTS

| | | | |
|---|---|---|---|
| 4,759,556 | 7/1988 | Udagawa | 277/235 B |
| 5,332,237 | 7/1994 | Haigwara et al. | 277/235 B |
| 5,344,165 | 9/1994 | Miyaoh et al. | 277/235 B |
| 5,570,892 | 11/1996 | Udagawa | 277/235 B |

*Primary Examiner*—Daniel G. DePumpo
*Attorney, Agent, or Firm*—Kanesaka & Takeuchi

[57] ABSTRACT

A metal gasket for an internal combustion engine of the invention is formed of a metal plate, which includes an outer periphery for defining the metal gasket, at least one cylinder bore, a bolt hole, and an oil hole situated between the bolt hole and the outer periphery. A bead is integrally formed with the metal plate to surround only the bolt hole and the oil hole. The bead is formed of two side walls and a center portion between the two side walls, and has a first portion close to the bolt hole and a second portion close to the oil hole. The width of the center portion at the first portion is smaller than that at the second portion and a standing angle of the side walls relative to the metal plate other than the bead at the first portion is smaller than that at the second portion. The bead can provide an equal surface pressure throughout the entire length thereof.

6 Claims, 2 Drawing Sheets

METAL GASKET WITH A BEAD SURROUNDING BOLT AND OIL HOLES

BACKGROUND OF THE INVENTION AND RELATED ART STATEMENT

The present invention relates to a metal gasket with a bead surrounding bolt and oil holes, which is used for an internal combustion engine.

As a cylinder head gasket, a metal or metal laminate gasket has been used since the gasket made of metal is strong against high temperature and high pressure. The cylinder head gasket situated between a cylinder block and a cylinder head is provided with water holes, oil holes, bolt holes, push rod holes and so on in addition to cylinder bores.

In the metal or metal laminate gasket, a bead is generally formed on a metal plate around a hole to be sealed. When the gasket is tightened, the bead is compressed between the cylinder head and the cylinder block and provides a counter force, which is used for sealing around the hole.

In the engine, a plurality of cylinder bores is arranged generally linearly, and various holes, such as bolt holes, water holes, oil holes and so on are situated around the cylinder bores. Since the bolt holes are arranged in the engine to provide a surface pressure as equal as possible around the cylinder bores in which high pressure is formed, the water holes, oil holes and so on situated around the cylinder bores are not equally compressed.

Also, the cylinder head is recently made of an aluminum alloy for providing light weight and high power for the engine. As a result, when the cylinder head is fixed to the cylinder block with the gasket therebetween, the cylinder head is affected by the counter force of the beads and is liable to bend upwardly at a middle area thereof. Therefore, the beads formed around the water holes and oil holes can not be compressed equally.

On the other hand, the oil holes are formed to supply oil to a valve mechanism attached to an upper part of the cylinder head. Since the oil holes do not directly relate to the cylinder head and cylinder block, the oil holes are generally formed at corners of the engine or portions projected from a main portion of the engine. Therefore, the oil holes are not equally tightened by the bolts.

In order that the bead around the oil hole is tightened by the bolts easily, therefore, the oil hole is arranged near one of the bolt holes. In this case, since the bead around the oil hole should not interfere with the tightening force of the bolt, the bead for sealing around the oil hole surrounds both the oil hole and the bolt hole. In this respect, the bead may be formed to have different spring constant such that the spring constant near the oil hole is made smaller than that near the bolt hole (Japanese Utility Model Publication (KOKAI) No. 2-101061). The bead near the oil hole may have waving portions to provide high surface pressure thereat (U.S. Pat. No. 5,570,892).

The above gasket operates properly. However, in order to securely seal around the oil hole with a moderate force, it is preferable to improve the sealing system around the oil hole.

In view of the above, the present invention has been made, and an object of the invention is to provide a metal gasket with a bead for sealing around the oil hole together with a bolt, which can seal properly at a moderate tightening pressure.

Another object of the invention is to provide a metal gasket as stated above, which can be made easily and economically.

Further objects and advantages of the invention will be apparent from the following description of the invention.

SUMMARY OF THE INVENTION

In accordance with the invention, a metal gasket for an internal combustion engine is formed of a metal plate for constituting the metal gasket, which includes an outer periphery for defining the metal gasket, at least one cylinder bore, a first bolt hole, a plurality of second bolt holes, and an oil hole situated adjacent to the first bolt hole and situated between the first bolt hole and the outer periphery.

A bead is integrally formed with the metal plate to surround only the first bolt hole and the oil hole. The bead is formed of two side walls and a center portion between the two side walls, and includes a first portion close to the bolt hole and a second portion close to the oil hole. The width of the center portion at the first portion is made smaller than that at the second portion, and a standing angle of the side walls relative to the metal plate other than the bead is made smaller at the first portion than that at the second portion.

Since the bead at the second portion near the oil hole has the wide center portion, when the gasket is tightened, the center portion can be compressed easily to have an inverted W shape to provide a wide and equal surface pressure thereat. Also, since the standing angle of the side wall at the first portion near the bolt hole is made small, the side walls at the first portion can be compressed easily. As a whole, the bead can be compressed easily to securely seal around the oil hole.

In the gasket, the center portion can be compressed to become nearly flat when the bead is strongly compressed, and the flattened bead recovers its shape when the force is relieved. Namely, the bead changes its shape according to the tightening pressure to securely seal around the oil hole.

In order to easily form the inverted W shape, i.e. wide sealing area, at the second portion of the bead when the gasket is tightened, the bead may have a depression in the center portion at at least the second portion. As a result, the center portion can be easily compressed when the gasket is tightened. The depression is preferably curved gradually to prevent crack at the curved portion.

Preferably, the width and the standing angle are changed gradually from the first portion to the second portion. Also, the width between the lower portions of the side walls is constant throughout the entire length of the bead. However, the width between the lower portions of the side walls at the first portion may be made smaller than that at the second portion. The height of the bead may be changed as well.

DETAILED DESCRIPTION OF THE PREFERRED EMBODIMENTS

Figure 1:
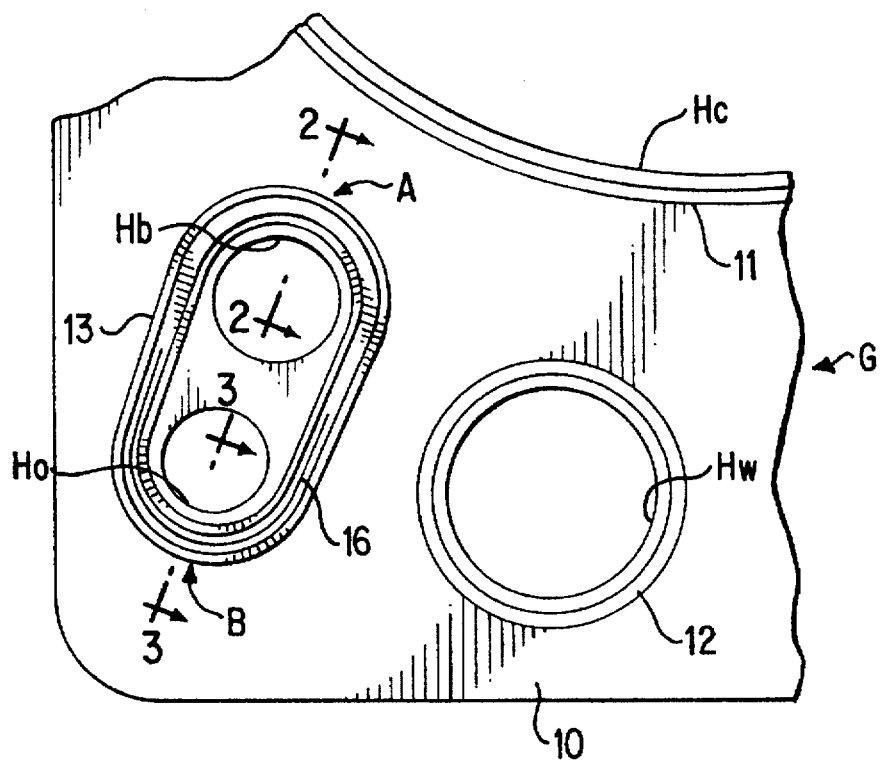
FIG. 1 is a plan view of a part of a gasket for showing an embodiment of the invention.
Figure 2:
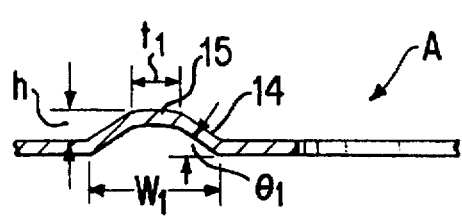
FIG. 2 is a sectional view taken along line 2—2 in FIG. 1.
Figure 3:
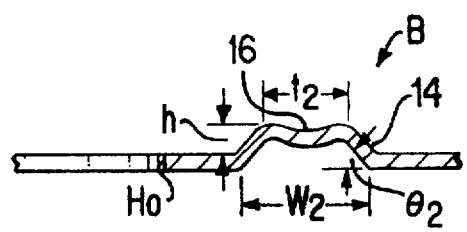
FIG. 3 is a sectional view taken along line 3—3 in FIG. 1.

The gasket G of the invention is a cylinder head gasket and is formed of one metal plate 10. The metal plate 10 includes a plurality of cylinder bores Hc, bolt holes Hb, water holes Hw, an oil hole Ho and so on, as in the conventional gasket. Also, the metal plate 10 includes beads 11, 12 around the cylinder bore Hc and the water hole Hw, and a bead 13 surrounding the bolt hole Hb and the oil hole Ho. Since the present invention is directed to the sealing structure, i.e. bead 13, around the bolt hole Hb and the oil hole Ho, explanation of the rest of the structure is omitted. The gasket can be made as desired, such as U.S. Pat. No. 5,570,892.

In the gasket G, the bolt holes are arranged around the cylinder bores Hc to provide surface pressure around the cylinder bores Hc as equal as possible. The oil hole Ho is situated near the corner of the gasket, i.e. between the bolt hole Hb and the periphery of the gasket.

The bead 13 is a flat and wide bead having side walls 14 and a center portion 15 between the side walls 14, and includes a bolt hole side A and an oil hole side B. The width $t_1$ of the center portion 15 at the bolt hole side A is made smaller than the width $t_2$ at the oil hole side B. Also, a standing angle $\theta_1$ of the side wall relative to the horizontal plane of the gasket at the bolt hole side A is made smaller than a standing angle $\theta_2$ at the oil hole side B.

The bead 13 basically has the structure as explained above. In the gasket G, however, the bead 13 includes a compressed portion 16 in the center portion 15. The compressed portion 16 may be formed in the entire center portion 15 of the bead 13, but preferably the compressed portion 16 is formed only at the oil hole side B. The compressed portion 16 helps deformation of the bead when the bead 13 is compressed.

The size of the bead 13 is different based on the size of the gasket or engine. However, in a regular cylinder head gasket, the width $W_1$ between the bottom portions of the side walls at the bolt hole side A is about 1.5 mm; the width $t_1$ of the center portion at the bolt hole side A is 0.5–1.0 mm; the width $W_2$ at the oil hole side B is 2–3 mm; the width $t_2$ at the oil hole side B is 1.0–2.0 mm; and the height h is 0.2–1.0 mm.

In the gasket of the invention, the height of the bead 13 does not change throughout the entire length thereof. However, the height of the bead 13 may be changed, e.g. the height of the bead at oil hole side B is made slightly higher than that at the bolt hole side A. The width $W_1$ and $W_2$ may be the same throughout the entire length of the bead, but the width $W_2$ may be slightly greater than the width $W_1$.

When the gasket G is tightened between a cylinder block CB and a cylinder head CH, the bead 13 is compressed. At the bolt hole side A, although the center portion 15 is relatively narrow in width, since the standing angle $\theta_1$ of the side walls of the bead is relatively low, the bead 13 at the bolt hole side A can be compressed relatively easily.

Figure 4:
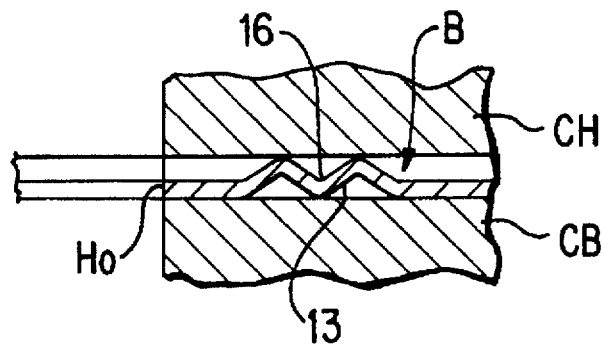
FIG. 4 is an explanatory sectional view for showing a compressed condition of a part of the gasket.

On the other hand, at the oil hole side B, since the center portion 15 is relatively wide in width, when the bead 13 is compressed, the center portion is deformed in the inversed W-shape (FIG. 4). As the bead with the inversed W-shape is further compressed, the bead deforms equally along the entire width thereof, and can provide an equal counter force thereat. Thus, it can provide an equal surface pressure along the entire width at a relatively weak tightening pressure.

As a whole, the bead 13 can be compressed relatively easily and provide a wide and equal surface pressure throughout the entire length thereof.

When the gasket G is tightened, the bead 13 is tightened by one bolt. Especially, the oil hole side B is only affected by a bolt passing through the bolt hole Hb, i.e. one side tightening. Therefore, when the engine is actuated, the periphery of the gasket, i.e. portion at the oil hole side B, vibrates severely to cause pulsation.

When the gasket G vibrates, the compressed portion of the bead follows the vibration. Namely, the compressed bead changes its size according to the pulsation to thereby securely seal around the oil hole Ho.

Figure 5:
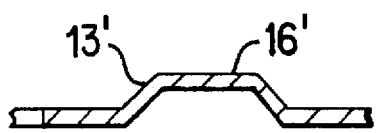
FIG. 5 is a sectional view, similar to FIG. 3, for showing a different embodiment.

In the gasket G, the standing angle of the side walls and the center portion are changed gradually. Also, the compressed portion 16 is formed in the bead 13 at the oil hole side B. However, even if the compressed portion 16 is not formed, the bead operates as intended. In this case, the center portion 16' of the bead 13' may be flat throughout the entire length thereof (FIG. 5).

Figure 6:
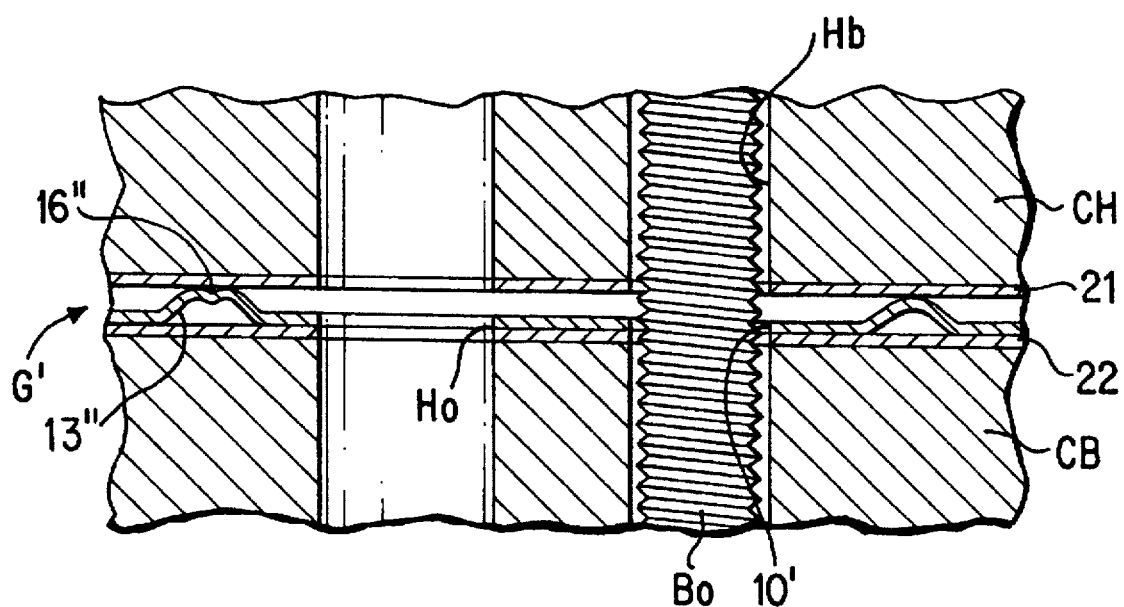
FIG. 6 is a sectional view of a part of a gasket for showing a still different embodiment of the invention.

FIG. 6 shows a metal laminate gasket G' disposed between the cylinder head CH and the cylinder block CB to be tightened by a bolt Bo, wherein the metal plate 10' is sandwiched between upper and lower plates 21, 22. The metal plate 10' has the structure as in the metal plate 10, but the edges between the center portion and the side walls are curved gradually, not relatively sharp as in the metal plate 10. Namely, the bead 13" has a wide portion at the oil hole side and a narrow portion at the bolt hole side A, and includes a center depression 16". The rest of the structure is the same as that of the gasket G, and the gasket G' operates as in the gasket G.

While the invention has been explained with reference to the specific embodiments, the explanation is illustrative and the invention is limited only by the appended claims.

What is claimed is:

1. A metal gasket for an internal combustion engine, comprising:

a metal plate for constituting the metal gasket including an outer periphery for defining the metal gasket, at least one cylinder bore, a first bolt hole, a plurality of second bolt holes, said first and second bolt holes surrounding cylinder bore, and an oil hole situated adjacent to the first bolt hole and situated between the first bolt hole and the outer periphery, and a bead integrally formed with the metal plate and surrounding only the first bolt hole and the oil hole, said bead being formed of two side walls and a center portion between the two side walls, and having a first portion close to the first bolt hole and a second portion close to the oil hole, the width of the center portion at the first portion being smaller than that at the second portion and a standing angle of the side walls relative to the metal plate other than the bead at the first portion being smaller than that at the second portion.

2. A metal gasket according to claim 1, wherein said bead includes a depression in the center portion at at least the second portion so that the center portion can be easily compressed when the gasket is tightened.

3. A metal gasket according to claim 2, wherein said depression is curved gradually.

4. A metal gasket according to claim 1, wherein said width and the standing angle are changed gradually from the first portion to the second portion.

5. A metal gasket according to claim 1, wherein the width between lower portions of the side walls is constant throughout the entire length of the bead.

6. A metal gasket according to claim 1, wherein the width between lower portions of the side walls at the first portion is smaller than that at the second portion.

* * * * *